Patented May 26, 1936

2,041,874

UNITED STATES PATENT OFFICE 2,041,874

COMPOSITION FOR PREVENTING SUNBURN

Frits E. Stockelbach, Montclair, N. J.

No Drawing. Application February 15, 1935,
Serial No. 6,646

2 Claims. (Cl. 167—90)

My present invention relates to a composition for preventing sunburn, reddening and blistering of the skin upon exposure of the latter to the sun.

The sun's rays having wave lengths between approximately 3,000 and 3,100 Angstrom units are generally considered as the cause of sunburn and blistering, while the rays between approximately 3,100 and 3,600 Angstrom units cause reddening of the skin without, however, causing blistering. It is, therefore, important that the sun's rays between approximately 3,000 and 3,600 Angstrom units should be absorbed or shielded from the skin to prevent both burning and blistering thereof. Hence, the function of a skin protective composition or chemical for preventing sunburn is to absorb or screen the rays of the sunlight between said aforementioned wave lengths. Heretofore, a great many organic compounds have been proposed for this purpose, and many have found some application in cosmetic creams, oils and lotions. Among these may be mentioned Aesculine, R-salt, quinine bisulphate, salol, etc. The majority of these, however, are rather irritating to the skin, while others, such as Aesculine, are extremely high priced.

I have discovered that menthyl salicylate, an ester which can be readily and cheaply formed through the reaction of menthol and salicylic acid, is highly effective as an absorbent or screen for rays having a wave length between approximately 3,000 and 3,600 Angstrom units, and thus serves as an effective protective agent against burning, reddening and blistering of the skin upon exposure to the sun, and I have further discovered that said menthyl salicylate is non-irritating to even very sensitive skins. In this latter respect, the property of menthyl salicylate could not have been foreseen, since other salicylates such as phenyl and benzyl salicylates cause irritation and rash.

In use as a preventative for sunburn of the skin due to exposure to the sun, the menthyl salicylate, which at summer temperatures is an oil, may be applied in either pure or diluted form directly to the skin before exposure, or it may be applied after being made up into a suitable lotion by solution in a suitable solvent such as alcohol or as an oil dissolved in a vegetable, animal, or mineral oil, or as a cosmetic by admixture with suitable waxes and oils to form a cream of proper consistency. In whatever manner of application the menthyl salicylate is applied to the skin, its effectiveness is primarily due to the film of menthyl salicylate which forms on the skin upon evaporation or absorption of the solvent, which film functions as an absorptive medium, screen or shield against penetration therethrough of wave lengths between approximately 3,000 and 3,600 Angstrom units. Although the proportion of menthyl salicylate in the lotion, cream or other vehicle may be relatively small, I have found that a cosmetic containing approximately 10% of menthyl salicylate possesses the antisunburning property to a marked degree.

A simple test for determining the effectiveness of the menthyl salicylate as an absorbent, screen or shield for light rays between approximately 3,000 and 3,600 Angstrom units can be carried out as follows: A silver mirror or screen is first prepared by precipitation of metallic silver upon a clean glass plate from a solution of silver nitrate by means of ammonia and Rochelle salts. When the silver film deposit is of such thickness that on looking through the mirror the sun appears as a dull indigo-colored disk, the mirror is of proper thickness to provide an effective filter or screen for the sun's rays, excepting those within the approximate limits above enumerated. The silver screen having been prepared, it is only necessary to place a photographic bromide paper in a photographic frame behind said screen, applying the cream containing the menthyl salicylate in a thin layer to the surface of the glass plate and exposing the photographic frame to sunlight for a minute or two. It will be found upon developing the paper that it will be white or nearly so, thus indicating that the sun's rays within the aforementioned limits have not penetrated the menthyl salicylate film. A photographic bromide paper exposed in the same manner behind such silver screen but without any of the protective cream applied to the surface of the glass, turns black upon developing, thus indicating that the sun's rays within the aforementioned limits have been freely transmitted through the glass plate.

Having now fully and completely described my invention and the manner in which it is to be used, I do not desire to be limited to any specific manner or mode of application of the menthyl salicylate to the skin for the purposes described, and hence in the appended claims where I have used the term "vehicle", it is to be understood that said term comprises any solvent, oil, cream or other medium which serves as a carrier for the menthyl salicylate for facilitating its application to and deposition into the pores of the skin of a user.

What I claim is:

1. A skin protective substance for preventing sunburn containing menthyl salicylate.

2. A cosmetic for preventing sunburn comprising approximately 10% menthyl salicylate in a vehicle.

FRITS E. STOCKELBACH.